Patented Jan. 9, 1934

1,942,844

UNITED STATES PATENT OFFICE 1,942,844

CELLULOSE ORGANIC ESTER COMPOSITION OF MATTER CONTAINING AN ESTER OF DIBROMO SUCCINIC ACID

Henry B. Smith, Rochester, N. Y., assignor to Eastman Kodak Company, Rochester, N. Y., a corporation of New York No Drawing. Application May 16, 1932
Serial No. 611,760

9 Claims. (Cl. 106—40)

This invention relates to compositions of matter in which cellulose organic esters, such as cellulose acetate, are combined or mixed with other substances, such as a compatible plasticizer, with or without a common solvent for both, and with or without other useful addition agents, so that the resulting product will have properties such as will make the composition highly advantageous for use in the plastic and analogous arts, such, for instance, as the manufacture of wrapping sheets or tissue, photographic film, artificial silk, varnishes or lacquers, coating compositions and the like.

One object of this invention is to produce compositions of matter which may be made into permanently transparent, strong and flexible sheets or films of desired thinness which are substantially waterproof, are unaffected by ordinary photographic fluids and possess the desired properties of a support for sensitive photographic coatings. Another object of my invention is to produce compositions of matter which are capable of easy and convenient manipulation in the plastic and analogous arts, such as in the manufacture of sheets, films, artificial silk filaments, varnishes, lacquers and the like, and to produce compositions which will not injure, or be injured by, the substances or surfaces with which they are associated during manufacture. Still another object of my invention is to produce compositions of matter containing cellulose acetate which have a high degree of flexibility, softness, pliability and clarity. Other objects will become apparent to those skilled in the art to which this invention pertains.

While cellulose acetate has been known for decades, it has also been known that to utilize it in the various plastic arts it is necessary to mix therewith such plasticizing or conditioning agents as triphenyl phosphate, monochlornaphthalene or the like. Certain of these and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the value of the resulting product. Addition products for the same or similar purposes are also added to cellulose acetate to prepare it for use in the other plastic arts, such as in the manufacture of lacquers, varnishes, artificial silk filaments, and the like. While the plasticizers or other addition agents heretofore discovered have had their utility in the art, the increasing use to which cellulose acetate has been put, and the increasing number of desirable properties required of cellulose acetate for most purposes have made the discovery of new and economical plasticizers or other addition agents a matter of considerable importance to the art. This has been a problem of some difficulty, since many of the nitrocellulose solvents are not solvents for cellulose acetate, and many substances which act as plasticizers for nitrocellulose are not sufficiently compatible with cellulose acetate to be used as plasticizers in cellulose acetate compositions.

I have discovered that valuable properties may be induced in and/or contributed to compositions containing cellulose organic esters, such as cellulose acetate, by adding thereto as a plasticizing compound a di-alkyl ester of aa'-dibromo succinic acid, such as the diethyl, di-n-propyl, and di-n-butyl esters. These esters have the general formula

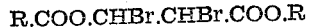

R.COO.CHBr.CHBr.COO.R where R represents an alkyl group. The particularly useful properties which they induce in and/or contribute to cellulose acetate compositions containing them are hereinafter enumerated.

The dialkyl esters of aa'-dibromo succinic acid may be prepared as follows:

Two gram-mols of the dialkyl maleate corresponding to the dialkyl dibromo succinate to be prepared is dissolved in 500 cc. of carbon tetrachloride in a 3-liter flask on a steam bath. 320 g. of bromine dissolved in 500 cc. of carbon tetrachloride is added as rapidly as decoloration takes place, with occasional shaking. Decoloration is slow, even on the steam bath. A little hydrobromic acid is given off. When all the bromine has been added, the resulting solution is washed with potassium carbonate solution to remove hydrobromic acid and free bromine. The aqueous layer is discarded, and the lower layer is distilled under diminished pressure. When the carbon-tetrachloride has distilled off, the ester is washed again with potassium carbonate solution, the aqueous layer is discarded, and the ester is distilled under diminished pressure. The diethyl, di-n-propyl and di-n-butyl esters of aa'-dibromo succinic acid are colorless oils with the following physical constants:

|  | Boiling point | Specific Gravity |
|---|---|---|
| Diethyl aa'-dibromo succinate | 130-133° C./7 mm. | 1.549 |
| Di-n-propyl aa'-dibromo succinate | 147-150° C./7 mm. | 1.500 |
| Di-n-butyl aa'-dibromo succinate | 173-175° C./8 mm. | 1.42 |

In order that those skilled in this art may better understand my invention I would state, by way of illustration, that for the manufacture of photographic film or other sheets my new compositions of matter be compounded as follows: 100 parts of acetone-soluble cellulose acetate, i. e. cellulose acetate containing from 36% to 42% acetyl radical, approximately, is dissolved with stirring at atmospheric temperature in 300 to 500 parts, preferably 400 parts, by weight, of acetone. To this solution may be added from 30 to 50 parts by weight of diethyl aa'-dibromo succinate or from 20 to 50 parts by weight of di-n-propyl aa'-dibromo succinate or from 30 to 40 parts by weight of di-n-butyl aa'-dibromo succinate, approximately. The amount of plasticizer may be decreased or increased, depending upon whether it is desired to decrease or increase, respectively, the properties which these plasticizers contribute to the finished product. The amount of solvent employed may also be increased or decreased, depending upon whether it is desired to have a more or less freely flowing composition, respectively.

A composition of matter prepared as above described may be deposited upon any suitable film-forming surface to form a film or sheet, in a manner well known to those skilled in the art. A film so produced has permanently brilliant transparency and low inflammability, burning less readily even than ordinary newsprint. In particular, films comprising di-n-butyl aa'-dibromo succinate have extremely low inflammability, even when as little as 15 parts by weight of di-n-butyl aa'-dibromo succinate is used per 100 parts by weight of cellulose acetate. Films produced in accordance with my invention are tough and flexible. For instance, a film of cellulose acetate plasticized with 50% (parts by weight based on the cellulose acetate) of di-n-propyl aa'-dibromo succinate had an initial flexibility 150% greater than that of film containing no plasticizer. Furthermore, film so plasticized maintains flexibility in a superior fashion. For instance, films containing from 30% to 50% of diethyl aa'-dibromo succinate maintained flexibility at 65° C. for from 131 to 142 days, films containing from 20% to 50% of di-n-propyl aa'-dibromo succinate maintained flexibility at 65° C. for 142 days, and a film containing 30% of di-n-butyl aa'-dibromo succinate maintained flexibility at 65° C. for 200 days, whereas an unplasticized film became brittle in 30 days. This indicates that films so plasticized will withstand ordinary usage satisfactorily for many years. The sum total of the above advantageous properties of products produced from my new compositions is considerably in excess of that of products produced with what have previously been regarded as the better plasticizers.

Other similar solvents (instead of acetone) which are compatible with the cellulose acetate and my new plasticizers will also occur to those skilled in this art, such as ethylene chloride-alcohol mixtures. In like manner these plasticizers may be compounded with other single organic esters of cellulose, such as cellulose propionate, butyrate, stearate and the like, or with mixed organic esters, such as cellulose aceto-stearate, cellulose aceto-propionate, cellulose aceto-butyrate, cellulose aceto-lactate or cellulose aceto-tartrate, a suitable solvent which will dissolve both the cellulosic derivative and the plasticizer being employed, such, for instance, as an alkylene chloride with or without the addition of alcohol.

Inasmuch as my above-described compositions of matter are useful in the production of films and sheets, it will be apparent that my new plasticizers may also be employed with advantage in the other branches of the plastic art. For instance, my above described compositions of matter may be employed in the manufacture of artificial silk by the dry spinning method. With the proper coagulating bath they may also be employed for wet spinning. It may be desired to employ compositions of different viscosity or evaporation characteristics, but this is a mere matter of changing the solvent proportion or adding evaporation retardents or other high or intermediate boiling constituents, as has been well known in the art for more than a decade. My novel plasticizers may also be employed with advantage in connection with a number of the known lacquer and varnish formulæ with which they may be found to be compatible. In such cases the plasticizer is usually first put into solution in the cellulose derivative solution, and if non-solvents are added for the purpose of cheapening the composition they are added only to such an extent as will not precipitate the derivative from solution. Also the plasticizer is usually employed in rather large amounts in compounding lacquers. Other uses within the scope of my invention will also suggest themselves to those skilled in the art and are to be included within the scope of the claims appended hereto.

Moreover, I have found that, upon the addition to cellulose acetate of approximately 100% of diethyl aa'-dibromo succinate or of di-n-propyl aa'-dibromo succinate, quite unexpected compatibility of the plasticizer with the cellulose acetate exists and also that quite unexpected flexibility and plasticity of the final product results. Contrary to experience in most cases where such a large proportion of plasticizer is used, no exudation or crystallizing out of the plasticizer occurs. Such compositions have great utility where a highly flexible compound is desired, such as in the coating of a base (for instance, cloth or other fabric) in the production of artificial leather or the production of relatively thin sheets wherein more than the usual flexibilty is important. Such a composition, if converted, for instance, into sheet form will be found to be supple and non-rigid, and to have the ability to conform readily to a surface upon which it may be placed, and this even at atmospheric temperatures.

These novel compositions of matter are produced by merely mixing the plasticizer with cellulose acetate and then adding sufficient of a common solvent, such as acetone, whereupon an intimate mixture of the plasticizer with the cellulose acetate results. The amount of acetone or other common solvent to be employed varies, of course, within rather wide limits depending upon the fluidity of the composition desired. 100 parts of acetone will suffice for many purposes, although we prefer to use 400 parts. Various high boilers or evaporation retardents, such as ethyl lactate, amyl acetate or the like may also be added if desired, as is well known in this art.

The compositions of matter so produced may then be coated into sheets in the usual way by depositing them upon plates or rolls and permitting the solvent to evaporate. If my novel compositions are to be employed in the manufacture of artificial leather, they may be coated upon, for instance, a cloth support and the solvent permitted to evaporate, or the cloth support may be caused to pass through the cellulose acetate-plasticizer composition and permitted to absorb the solution, the solvent in the coating being then permitted to evaporate. In either case, the solvent may, of course, be recovered if desired by condensing the vapors, etc.

While above and in certain of the claims appended hereto, I have referred to the use of a plasticizer in approximately equal proportions, namely in a ratio of approximately 100%, it will be understood that within this terminology variations of from 10% to 15% less than 100% of plasticizer and as much as 25% to 50% more than 100% of the plasticizer may in some instances be desirable.

While I have described the use of normal alkyl esters of aa'-dibromo succinic acid, it will be obvious that I may likewise use the isomeric alkyl esters, such, for instance, as di-isopropyl aa'-dibromo succinate or di-tertiary butyl aa'-dibromo succinate.

What I claim as my invention and desire to be secured by Letters Patent of the United States is:

1. A composition of matter comprising an organic ester of cellulose and a di-alkyl ester of aa'-dibromo succinic acid as a plasticizer for the organic ester of cellulose.

2. A composition of matter comprising cellulose acetate and a dialkyl ester of aa'-dibromo succinic acid as a plasticizer for the cellulose acetate.

3. A composition of matter comprising cellulose acetate and diethyl aa'-dibromo succinate as a plasticizer for the cellulose acetate.

4. A composition of matter comprising cellulose acetate and di-n-propyl aa'-dibromo succinate as a plasticizer for the cellulose acetate.

5. A composition of matter comprising cellulose acetate and di-n-butyl aa'-dibromo succinate as a plasticizer for the cellulose acetate.

6. A composition of matter comprising 100 parts of cellulose acetate and, as a plasticizer therefor, about 10 to 40 parts, by weight, of a compound selected from the group consisting of diethyl aa'-dibromo-succinate, di-n-propyl aa'-dibromo succinate, and di-n-butyl aa'-dibromo succinate.

7. A composition of matter comprising 100 parts of cellulose acetate and, as a plasticizer therefor, about 10 to 100 parts, by weight, of a compound selected from the group consisting of diethyl aa'-dibromo succinate and di-n-propyl aa'-dibromo succinate.

8. A relatively thin, flexible sheet comprising 100 parts of cellulose acetate and about 10 to 40 parts, by weight, of a compound selected from the group consisting of diethyl aa'-dibromo succinate, di-n-propyl aa'-dibromo succinate, and di-n-butyl aa'-dibromo succinate.

9. A relatively thin, flexible sheet comprising 100 parts of cellulose acetate and about 10 to 100 parts, by weight, of a compound selected from the group consisting of diethyl aa'-dibromo succinate and di-n-propyl aa'-dibromo succinate.

HENRY B. SMITH.